A. SMAILL, Jr.
MILKING MACHINERY.
APPLICATION FILED MAY 8, 1908.
982,161.
Patented Jan. 17, 1911.
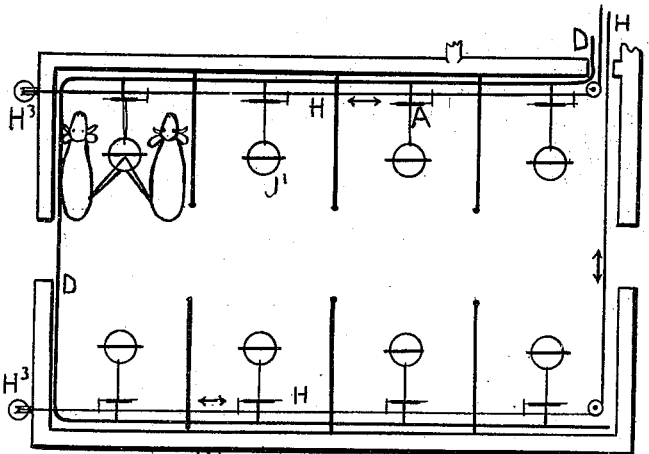
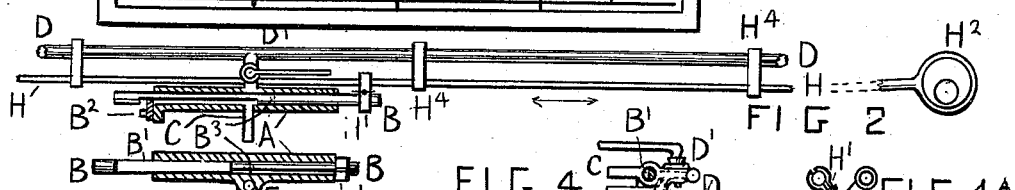
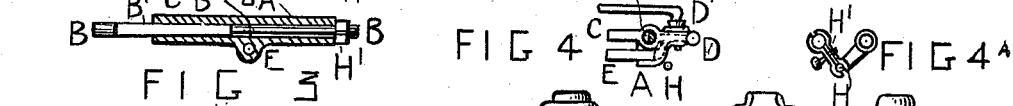
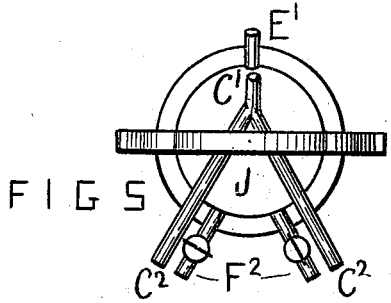
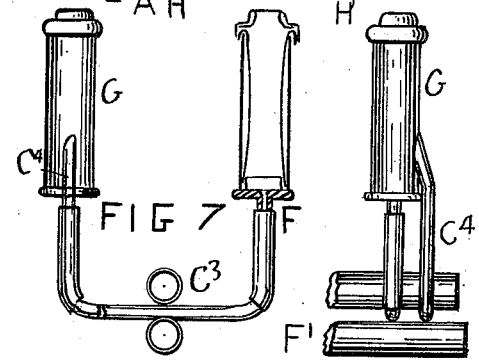
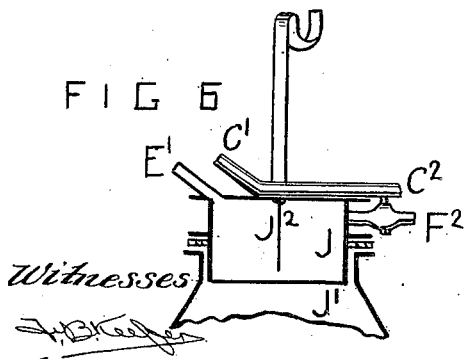
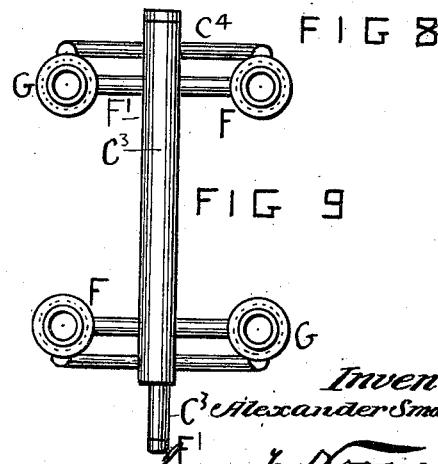
Witnesses
Inventor
Alexander Smaill Jr
James L. Norris
THE NORRIS PETERS CO., WASHINGTON, D. C.

UNITED STATES PATENT OFFICE.

ALEXANDER SMAILL, JR., OF TOMAHAWK, NEAR DUNEDIN, NEW ZEALAND.

MILKING MACHINERY.

982,161.     Specification of Letters Patent.     Patented Jan. 17, 1911.

Application filed May 8, 1908. Serial No. 431,673.

*To all whom it may concern:*

Be it known that I, ALEXANDER SMAILL, Jr., dairy farmer, a subject of His Majesty the King of Great Britain, residing at Tomahawk, near Dunedin, in the British Dominion of New Zealand, have invented certain new and useful Improvements in Milking Machinery; and I do hereby declare the following to be a full, clear, and exact description of the invention, such as will enable others skilled in the art to which it appertains to make and use the same.

The object of this invention is to produce an improved milking machine, worked preferably by one vacuum main, but which has an intermittent as well as a continuous vacuum. Two animals are milked either at the same time or separately as required in each stall. Very special attention has been given to the arrangement and formation of all parts so that they can be quickly and easily cleaned, got at, and replaced for use.

I produce a continuous vacuum by air-pump in the usual way, preferably by power, leading the single vacuum pipe conveniently over each stall used for milking, furnishing same with a cock that can work for two animals. This cock leads to a pulsator which by reciprocation motion of its rod partly breaks and then remakes the vacuum at regular intervals thus giving the action of an animal sucking on the teats.

Referring to the accompanying drawing:—Figure 1 is the plan of a small double byre as fitted with my machinery. Fig. 2 is an enlarged detail of the pulsator, being a sectional plan, and Fig. 3 is a longitudinal section and Fig. 4 a cross section of same. Fig. 4ª is a similar cross section but showing the connections for working the reciprocating rod of the pulsator. Fig. 5 is a plan of a can-cover. Fig. 6 a cross section of same. Fig. 7 is part end elevation and part section of the milking attachment applied to the teats and Fig. 8 is part side elevation of same. Fig. 9 is a plan of this attachment.

A is the body of the pulsator through a rod B furnished with a keyway-like long slot $B^1$ to admit air for breaking vacuum at part of the stroke. A guide or stop $B^2$ adjustable to this slot prevents the rod turning and keeps it with the round back pressing against the vacuum port as required. A hole $B^3$ in this rod comes opposite the vacuum branch at a point of the stroke of the rod B and this makes vacuum through the tubes which compresses the teats while the air admitted at other time past the slot $B^1$ breaks the vacuum.

C is a short tube for flexible tube connection with tube $C^1$. This tube branches to tubes $C^2$ $C^2$ for flexible tube connections each to a tube $C^3$ which has an open passage only to the cross tubes $C^4$ the latter opening into the side of the teat sheaths G, outside the rubber lining, the making and breaking of the vacuum causes the sucking action on the teats of these rubber linings, one to each. The main vacuum pipe line D has cocks $D^1$ at each pulsator and when open they always tend to keep a vacuum in the cans $J^1$ through the tubes E flexibly connected to tube $E^1$ on can-lid J. The milk drawn by said vacuum falls to the lower covers F of sheaths G which are rubber lined as described.

The tubes from covers F open only to the longer and lower tubes $F^1$ which are under the intermittent air tubes $C^3$ as shown. $F^1$ is flexibly connected to taps $F^2$ on can lids J, one tap for one of the two animals that can be milked at the same pulsator. The teat sheath attachments can be conveniently hung on the horns over the can lid shown. The reciprocating rod-valve B is capable of instant attachment by the clip $H^1$ to the rod H which continually moves by such means as the eccentric indicated $H^2$ which moves all rods H. These are kept in tension when required by weights $H^3$. The rods may be wholly or partly wire-rope as indicated. They may conveniently slide through brackets supported by tube D as indicated $H^4$. It is obvious that one large pulsator of the make shown may be used but it is thought that the method shown is preferable as requiring one pipe or tube only, D. Also the action of small pulsators locally placed is more even than one at the engine, or near it. The cover of can $J^1$, marked J is merely laid in place with a rubber ring as indicated, the vacuum keeping all tight. The pulsators may have packing glands if desired.

The tubes of Y shape $C^1$ $C^2$ are merely soldered to the cover J as a convenient resting place, they have no connection with it. Two animals are indicated in one stall, in approximate milking position. The rod or line H is led over pulleys as indicated, to conveniently change the direction of motion; any usual way could be adopted. This machinery would serve a large number of stalls and any suitable sizes or materials may be adopted. The flexible connecting tubes, not shown, would connect as follows:—

The continuous vacuum tube main, D, connects at E which is always open to the vacuum pump, and to tube $E^1$ on can lid J thus keeping the can $J^1$ always exhausted.

The intermittent vacuum made and broken at about 30 beats a minute or so, by the pulsator is connected through C to $C^1$, then one of the branches $C^2$ to $C^3$ and finally $C^4$ to outside the rubber lining of the sheath G. This latter has no connection with the milk anywhere.

The milk tube connects F through $F^1$ to $F^2$ and so through lid J to the can $J^1$. In the lid there is a partition marked $J^2$, this is important as it intercepts any milk spray from getting into the vacuum tube $E^1$ as is the case in many makes where the milk gets bad and causes great trouble in parts I now keep clean.

Having now described my invention, what I claim and desire to protect by Letters Patent of the United States, is:—

1. In milking machinery, the combination of a milk receptacle continuously subjected to vacuum influence, a closure means for the receptacle divided by an interiorly disposed partition, teat cups having flexible linings and connected to the said closure and vacuum means, the partition in the closure means preventing the diversion of any milk or milk spray and avoiding passage of any milk into the connection to the vacuum means, a pulsator having a reciprocating rod, and reciprocating means connected to the rod of the pulsator and controlling the action of the teat cups by setting up an operation of the flexible linings of the latter solely from the outer sides of said cups and acting on the teats of the animal milked by alternately opening a connection with the vacuum means and the air.

2. In milking machinery, the combination with teat engaging devices and vacuum means, of a pulsator operatively associated with said devices and means and consisting of a tubular body having a vacuum branch, a rod shiftably mounted in the body and having a long slot to admit air for breaking vacuum at a part of the stroke and provided with a guide or stop to maintain the same in position and also with an opening to register with the vacuum branch to make the vacuum and compress the teats, the opening when out of registration with the vacuum branch by shifting movement of the rod causing the latter to break the vacuum, the pulsator being operative in conjunction simultaneously with a plurality of the teat engaging devices, and a milk receptacle connected to the teat engaging devices and vacuum means.

3. In milking machinery, the combination with a pulsator, teat engaging devices and vacuum means, of a can having a lid divided by a partition disposed inside the said lid, the lid of the can being connected to the teat engaging devices and vacuum means, the partition preventing the diversion of any milk or milk spray and avoiding passage of any milk into the connections to the vacuum means.

In testimony whereof, I affix my signature, in presence of two witnesses.

ALEXANDER SMAILL, Junr.

Witnesses:
  HENTON MACAULAY DAVEY,
  ELIZABETH ANN DAVEY.